United States Patent
Bailey et al.

(10) Patent No.: US 11,249,519 B2
(45) Date of Patent: Feb. 15, 2022

(54) MAGNETIC HINGE CONNECTION

(71) Applicant: Microsoft Technology Licensing, LLC, Redmond, WA (US)

(72) Inventors: Katherine Margaret Bailey, Seattle, WA (US); Karsten Aagaard, Monroe, WA (US); Minh Cao Nguyen, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/782,741

(22) Filed: Feb. 5, 2020

(65) Prior Publication Data

US 2021/0096605 A1  Apr. 1, 2021

Related U.S. Application Data

(60) Provisional application No. 62/908,999, filed on Oct. 1, 2019.

(51) Int. Cl.
  *G06F 1/16* (2006.01)
  *E05D 1/06* (2006.01)
  *H01F 7/02* (2006.01)

(52) U.S. Cl.
  CPC .......... *G06F 1/1669* (2013.01); *E05D 1/06* (2013.01); *G06F 1/1643* (2013.01); *G06F 1/1683* (2013.01); *H01F 7/0252* (2013.01); *E05Y 2201/46* (2013.01); *E05Y 2900/606* (2013.01)

(58) Field of Classification Search
  CPC .... G06F 1/1669; G06F 1/1683; G06F 1/1643; H01F 7/0252; E05D 1/06; E05Y 2900/606; E05Y 2201/46
  See application file for complete search history.

(56) References Cited

U.S. PATENT DOCUMENTS

| | | | | |
|---|---|---|---|---|
| 8,143,983 B1 * | 3/2012 | Lauder | ...... | G06T 1/00 335/219 |
| 8,498,100 B1 * | 7/2013 | Whitt, III | ...... | G06F 3/0219 361/679.17 |
| 8,599,542 B1 * | 12/2013 | Healey | ...... | G06F 1/1626 361/679.17 |
| 8,780,540 B2 * | 7/2014 | Whitt, III | ...... | F16M 11/38 361/679.09 |
| 8,817,457 B1 * | 8/2014 | Colby | ...... | G06F 1/1681 361/679.29 |
| 9,036,340 B1 * | 5/2015 | Colby | ...... | G06F 1/1667 361/679.29 |
| 9,075,566 B2 * | 7/2015 | Whitt, III | ...... | G06F 1/1684 |

(Continued)

OTHER PUBLICATIONS

"International Search Report and Written Opinion Issued in PCT Application No. PCT/US20/051715", dated Jan. 20, 2021, 13 Pages.

*Primary Examiner* — Anthony M Haughton
*Assistant Examiner* — Theron S Milliser
(74) *Attorney, Agent, or Firm* — Ray Quinney & Nebeker P.C.; Paul N. Taylor

(57) ABSTRACT

A computing device is movable into an airplane mode. A spine on a hinge connects a display to a keyboard. The back surface of the keyboard includes keyboard magnetic material and the spine include spine magnetic material. The spine magnetic material is magnetically attracted to the keyboard. In the airplane mode, the spine is magnetically connected to the keyboard such that the display is secured relative to the keyboard.

19 Claims, 5 Drawing Sheets

(56) References Cited

U.S. PATENT DOCUMENTS

| | | | |
|---|---|---|---|
| 9,218,025 B2* | 12/2015 | Bates | B23P 19/00 |
| 9,256,256 B2* | 2/2016 | Liang | F16M 11/10 |
| 9,268,369 B2* | 2/2016 | Hirai | G06F 1/1669 |
| 9,426,905 B2* | 8/2016 | Bathiche | G06F 1/1679 |
| 9,489,054 B1* | 11/2016 | Sumsion | G06F 1/1681 |
| 9,507,384 B2* | 11/2016 | Liang | G06F 1/1679 |
| 9,625,951 B2* | 4/2017 | Liang | G06F 1/1616 |
| 9,674,335 B2* | 6/2017 | Chen | H04W 8/22 |
| 9,740,238 B2 | 8/2017 | Han | |
| 9,846,451 B2 | 12/2017 | Koo | |
| 9,870,066 B2* | 1/2018 | Whitt, III | G06F 1/1679 |
| 9,905,964 B2* | 2/2018 | Degner | H01R 13/6205 |
| 9,910,464 B2* | 3/2018 | Lyles | G06F 1/1669 |
| 9,927,842 B2 | 3/2018 | Park et al. | |
| 10,101,774 B2 | 10/2018 | David et al. | |
| 10,146,267 B2 | 12/2018 | Perelli | |
| 10,254,803 B1 | 4/2019 | Quinn et al. | |
| 10,474,199 B2* | 11/2019 | Longo | G06F 1/1656 |
| 10,615,538 B2* | 4/2020 | Cho | H01R 13/6205 |
| 10,671,121 B2* | 6/2020 | Zhu | G06F 1/1622 |
| 2010/0238620 A1* | 9/2010 | Fish | G06F 1/1681 |
| | | | 361/679.09 |
| 2011/0292584 A1* | 12/2011 | Hung | G06F 1/1632 |
| | | | 361/679.26 |
| 2013/0088431 A1* | 4/2013 | Ballagas | G06F 1/1626 |
| | | | 345/168 |
| 2013/0170126 A1* | 7/2013 | Lee | G06F 1/1681 |
| | | | 361/679.17 |
| 2013/0229354 A1* | 9/2013 | Whitt, III | H04M 1/72527 |
| | | | 345/169 |
| 2013/0229570 A1 | 9/2013 | Beck et al. | |
| 2013/0229773 A1* | 9/2013 | Siddiqui | G06F 1/1654 |
| | | | 361/679.59 |
| 2013/0242495 A1* | 9/2013 | Bathiche | G06F 1/1679 |
| | | | 361/679.28 |
| 2014/0185215 A1* | 7/2014 | Whitt, III | G06F 1/166 |
| | | | 361/679.4 |
| 2015/0227212 A1* | 8/2015 | Whitt, III | G06F 1/1679 |
| | | | 341/22 |
| 2015/0277508 A1* | 10/2015 | McCracken | H01H 13/86 |
| | | | 361/679.3 |
| 2015/0281413 A1* | 10/2015 | Longo | G06F 1/1669 |
| | | | 455/575.3 |
| 2016/0026221 A1* | 1/2016 | Lee | G06F 1/1632 |
| | | | 361/679.29 |
| 2016/0048173 A1* | 2/2016 | Lyles | G06F 1/1656 |
| | | | 361/679.17 |
| 2016/0299537 A1* | 10/2016 | Whitt, III | G06F 3/0202 |
| 2018/0136697 A1* | 5/2018 | Lee | G06F 1/1681 |
| 2018/0309232 A1* | 10/2018 | Cho | H01R 13/60 |

* cited by examiner

MAGNETIC HINGE CONNECTION

CROSS-REFERENCE TO RELATED APPLICATIONS

This application claims the benefit of U.S. Provisional Patent Application No. 62/908,999, filed on Oct. 1, 2019, which is hereby incorporated by reference in its entirety.

BACKGROUND

Background and Relevant Art

A computing device may be changeable between many different modes, including a laptop mode, a tablet mode, a closed, mode, and airplane mode, and others. Each of these different modes is used by the user in a different way. In some modes, the user may primarily interact with a keyboard and trackpad. In some modes, the user may primarily interact with a touchscreen display. In some modes, the user may interact with the keyboard, trackpad, and the touch screen display. The user's interaction with the computing device has a different level of stability in different modes.

BRIEF SUMMARY

In some embodiments, a keyboard includes a first surface including an input portion and a second surface including keyboard magnetic material. A spine is configured to connect the keyboard to a computing device. The spine includes spine magnetic material. A hinge connects the spine to the keyboard.

In some embodiments, a computing device includes a display and a removable keyboard. A back surface of the keyboard includes keyboard magnetic material. A spine is connected to the removable keyboard with a hinge. The spine removably connects the display to the removable keyboard. The spine includes spine magnetic material. In an airplane mode, the keyboard magnetic material is magnetically attracted to the spine magnetic material to provide additional stability for the user.

In yet other embodiments, a method for securing a computing device includes rotating a keyboard away from a display surface, the keyboard being rotated about a hinge. The hinge being magnetically affixed to a back surface of the keyboard after the keyboard is rotated to secure the device in an airplane posture.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
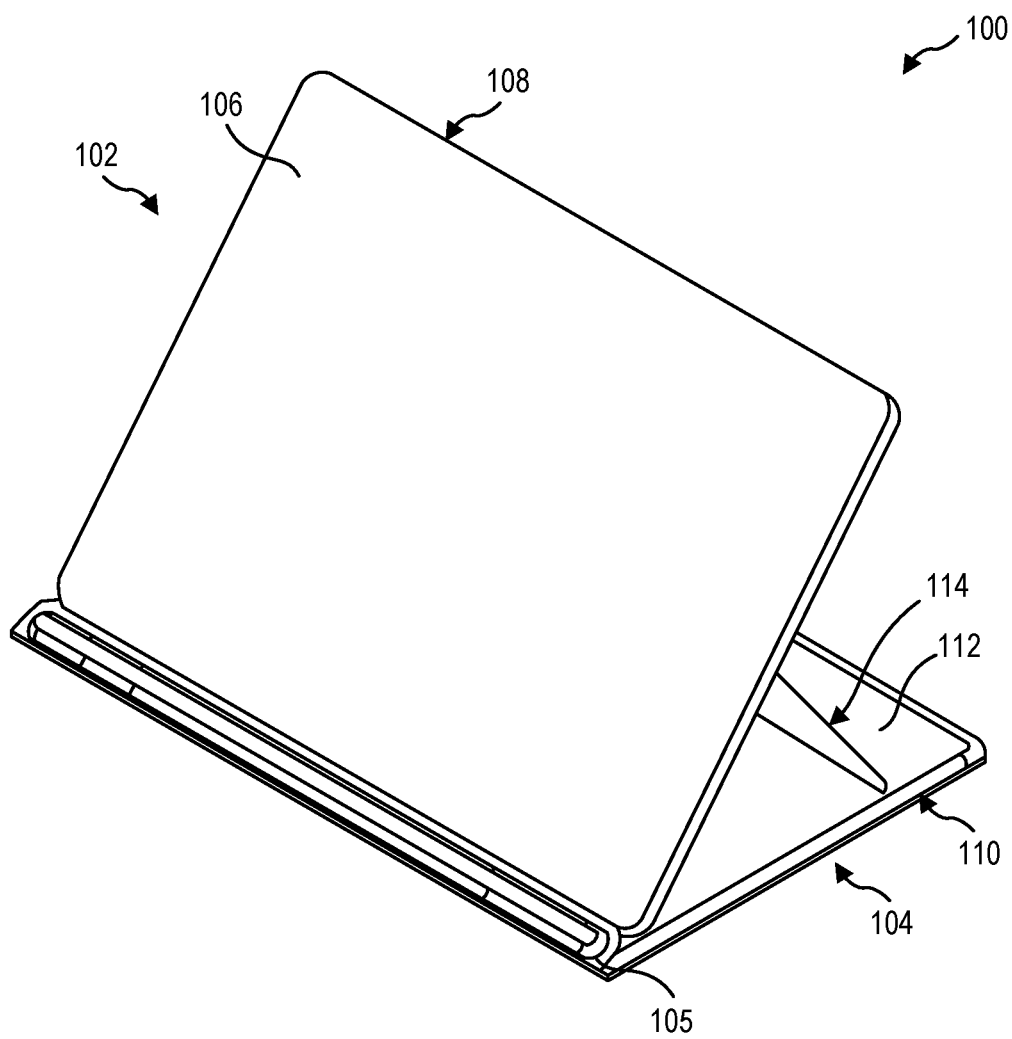
FIG. 1 is a representation of a perspective view of a computing device in an airplane mode, according to at least one embodiment of the present disclosure.

This disclosure generally relates to devices, systems, and methods for magnetically coupling a display to an underside of a keyboard in an airplane mode. Computing devices may be changeable between multiple different modes or configurations, such as a laptop mode where the keyboard is extended in front of a display, a tablet mode, where the keyboard is located against a back surface of the display, and an airplane mode, where the display is located at an angle with respect to the keyboard. In the airplane mode, the keyboard is underneath the display, with the display supported on the keyboard using a kickstand (e.g., as illustrated in FIG. 1). Although this description focuses on a detachable keyboard accessory, the airplane mode configuration teachings are also applicable to other types of accessories, such as device covers that do not include keyboards.

In the airplane mode, the input section of the keyboard is not accessible to the user. To interact with the display, the display is therefore used as a touchscreen display. As the user touches and interacts with the touchscreen display, the force of the user's touches against the display may cause the body of the display to move and bounce around. This may make using the display frustrating for the user. Magnetically securing a keyboard spine to the keyboard enhances the connection between the display to the keyboard, providing additional support the display during use in airplane mode.

FIG. 1 is a representation of a perspective view of a computing device 100 in an airplane mode, according to at least one embodiment of the present disclosure. The computing device includes a display 102 (e.g., a tablet computer) and an accessory 104 (e.g., a keyboard). The display 102 may be connected to the accessory 104 with a hinge 105. The display 102 and the accessory 104 are rotatable relative to each other about the hinge 105.

The display 102 includes a display surface 106 and a display back surface 108. In some embodiments, the accessory 104 is a device cover or screen protector that is attached to the display 102. In some embodiments, the device cover includes a keyboard, touchpad, or other user input device that is in communication with the display 102. In some embodiments, the accessory 104 is a detachable keyboard. The keyboard 104 includes a keyboard surface 110 and a keyboard back surface 112. In the airplane mode, the display back surface 108 and the keyboard back surface 112 face each other, e.g., with the display 102 propped up against the keyboard 104 using a kickstand 114 or similar mechanical support. In the airplane mode, the display 102 may be oriented relative to the keyboard 104 at a viewing angle convenient for the user to use close to the body, such as in a lap, on an airplane tray, on a bus tray, and in other confined locations.

Figure 2:
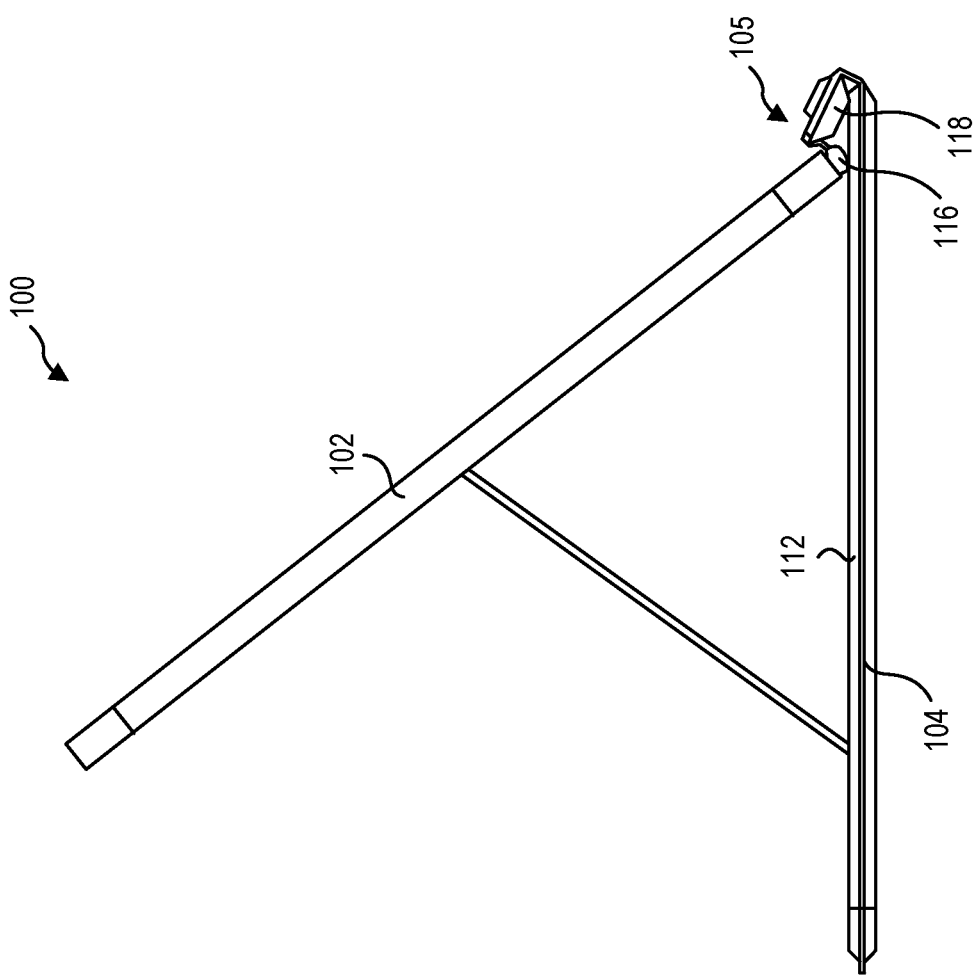
FIG. 2 is a side view of the computing device of FIG. 1 in the airplane mode.

FIG. 2 is a side view of the computing device 100 of FIG. 1 in the airplane mode. The hinge 105 includes a spine 116 and a hinge support 118 (e.g., a mid-spine component). The hinge support 118 may support the hinge 105 between the display 102 and the keyboard 104. The hinge support 118 may also include one or more magnets for coupling to the display in a Longo mode and/or a stylus charging dock. The hinge support 118 in conjunction with the flexible hinge portions on either side of it allow for the keyboard to be folded into multiple orientations including closed, laptop mode, Longo mode, and airplane mode. For example, the hinge support 118 may help prevent the hinge 105 from bending too sharply and damaging any electronic connections between the spine 116 and the keyboard. In some embodiments, the hinge 106 includes configurations and components not shown in FIG. 1. For example, the hinge 106 does not include mid-spine and flexible portions, but rather has a more uniform flexibility throughout. Importantly, the hinge 106 allows the accessory 104 to cover the display in a closed configuration and fold back into an airplane configuration as shown in FIG. 1.

The spine 116 is a connector to the display 102. For example, the spine 116 may magnetically and/or mechanically connect the display 102 to the accessory 104. The spine 116 may further provide data communication between the keyboard 104 and the display 102. In the airplane mode, the spine 116 is in contact with the keyboard back surface 112. This may provide further support for the display 102 as the user interacts with the display 102. As the user interacts with the display 102, the forces caused by touching the display (such as with a finger, a stylus, or other implement) may cause the display to move, slide, bounce, jiggle, shake, or otherwise move relative to the keyboard. This movement may result in imprecise interaction with the display 102, causing the user to enter incorrect inputs and/or not be able to focus on displayed outputs, which decreases user experience.

The spine 116 may be connected to the keyboard back surface 112. This may secure the display 102 to the keyboard 104. In this manner, as a user interacts with the display 102, the display 102 may remain fixed relative to the keyboard 104. This may increase the precision of input on the display 102, and improve the user experience. In the embodiment shown, the spine 116 is connected to the keyboard with a magnetic connection. In this manner, the spine 116 may be releasably secured to the keyboard 104. Moreover, the same magnets may be used to secure the display to the spine 116 and to secure the spine 116 to the keyboard back surface 112. In some embodiments, magnets in the hinge support 118 may magnetically secure to magnets in the keyboard back surface 112 (e.g., in addition to, or alternatively to, having magnets in the spine 116). In some embodiments, the kickstand 114 includes magnets that magnetically secure the kickstand 114 to the keyboard back surface 112 (e.g., in addition to, or alternatively to, having magnets in the spine 116).

Figure 3:
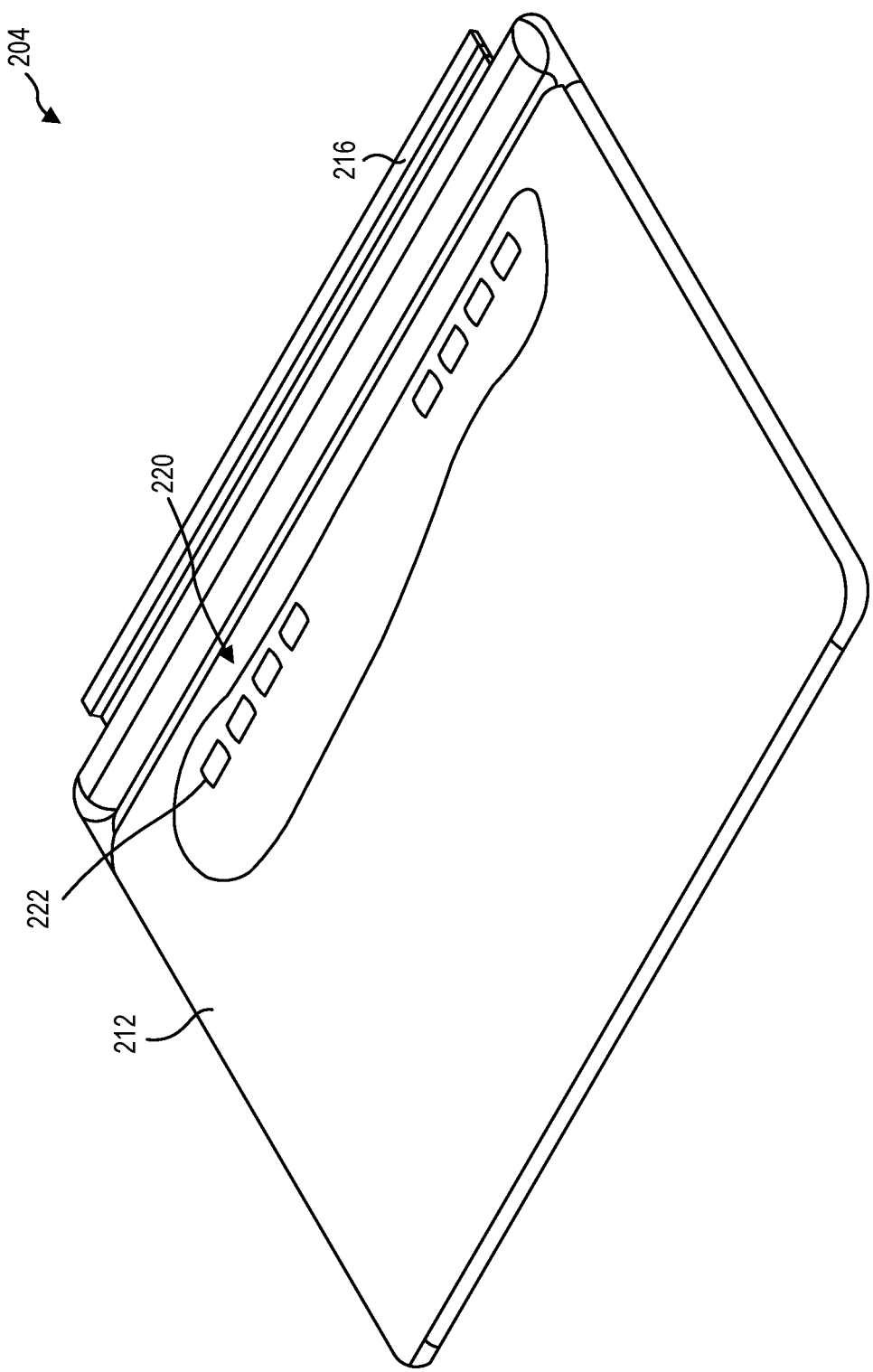
FIG. 3 is a representation of a perspective view of a keyboard, according to at least one embodiment of the present disclosure.

FIG. 3 is a representation of the back surface of a keyboard 204, according to at least one embodiment of the present disclosure. In the embodiment shown, the keyboard 204 is disconnected from a display (e.g., the display 102 of FIG. 1). The keyboard 204 has a portion of the fabric cover cut out for clarity. In the embodiment shown, the keyboard back surface 212 includes magnetic material 220. For example, the magnetic material 220 includes a plurality of magnets 222. In the embodiment shown, the keyboard 204 includes eight magnets 222. The magnets are separated into two groups of four magnets each. The groups of magnets 222 may allow for a longer and more stable connection to the spine 216, thereby improving the connection to the display. Although eight magnets are shown in FIG. 3, other numbers and grouping of magnets could be used. For example, two magnets could be used, or nine magnets in three groups of three could be used. In some embodiments, the arrangement of magnets in the keyboard 204 (or other accessory) is based on the arrangement of magnets in the spine 216 (e.g., spine 116) for use with coupling to the display device.

Figure 4:
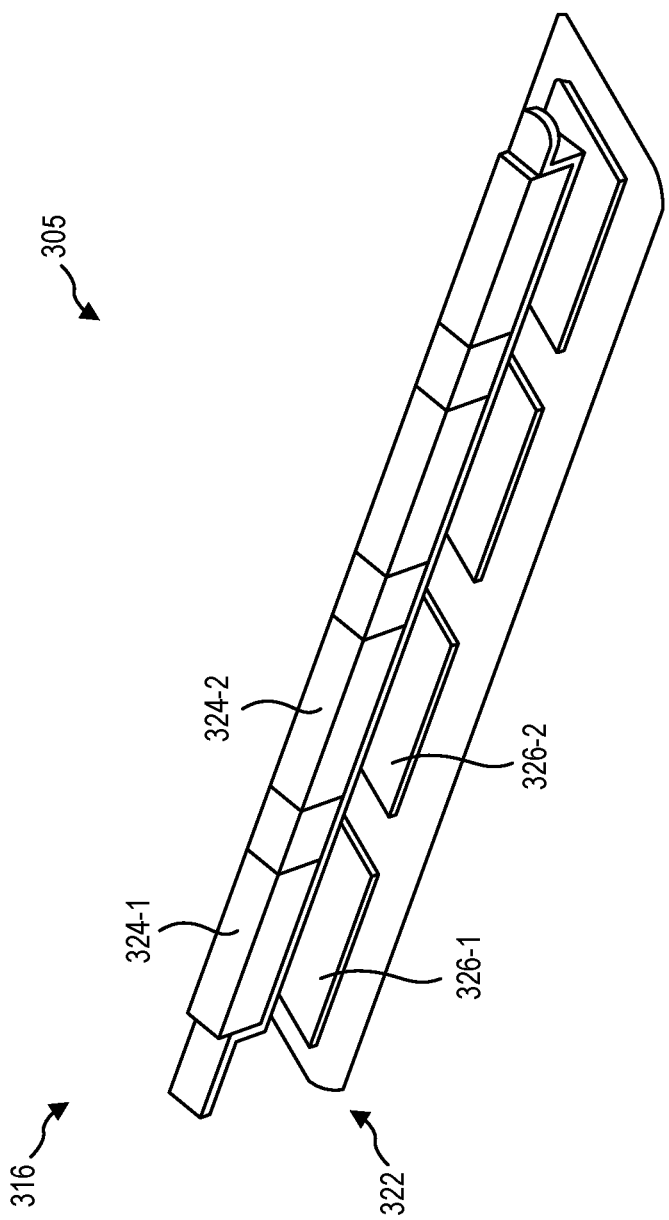
FIG. 4 is a representation of a hinge, according to at least one embodiment of the present disclosure.

FIG. 4 is a representation of a portion of a hinge 305 (e.g., hinge 105) in the airplane mode, according to at least one embodiment of the present disclosure. The hinge 305 includes a spine 316 magnetically connected to a plurality of keyboard magnets 322. The spine 316 includes a first spine magnet 324-1 and a second spine magnet 324-2. The keyboard magnets 322 include a first keyboard magnet 326-1 and a second keyboard magnet 326-2.

The first spine magnet 324-1 is magnetically attracted to the first keyboard magnet 326-1 and the second spine magnet 324-1 is magnetically attracted to the second keyboard magnet 326-2. In other words, the first spine magnet 324-1 has an opposite polarity of the first keyboard magnet 326-1, and the second spine magnet 324-2 has an opposite polarity of the second keyboard magnet 326-2.

In the embodiment shown, the first spine magnet 324-1 has a first polarity and the second spine magnet 324-2 has a different polarity (such as the opposite polarity, or a polarity that is rotated by 90°). In other words, the spine magnets 324 have alternating polarities (e.g., form a Halbach array). The keyboard magnets 322 have opposing alternating polarities. Alternating polarities may increase the strength of the magnetic connection of the hinge 305. Similarly, other types of Halbach arrays could be used to increase the coupling between the spine and keyboard back surface.

Figure 5:
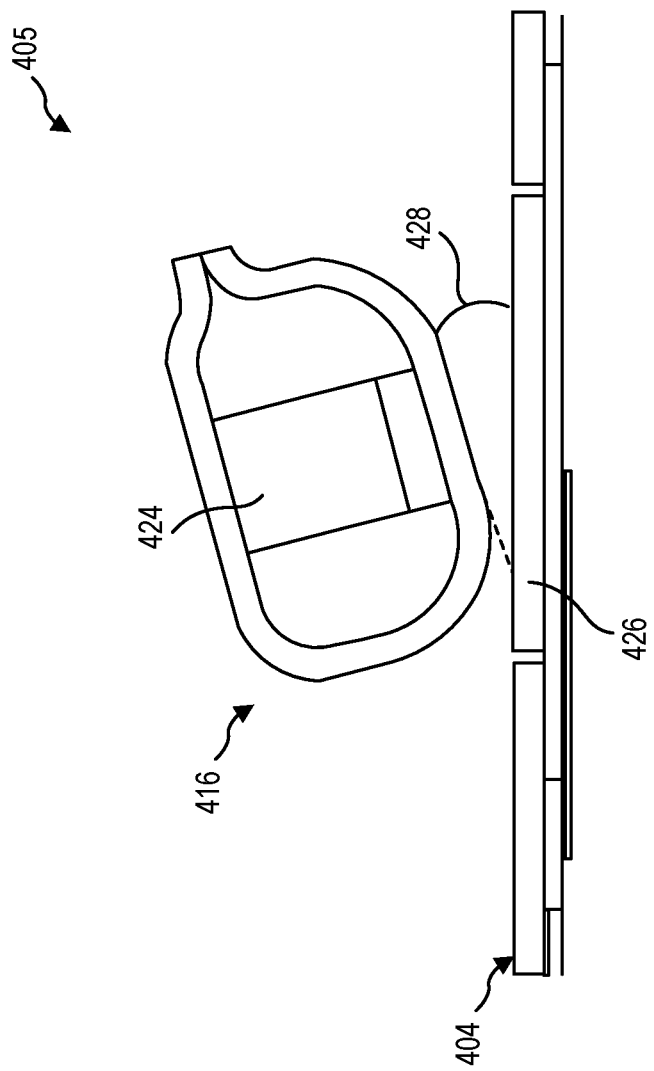
FIG. 5 is a representation of a cross-sectional view of a hinge, according to at least one embodiment of the present disclosure.

FIG. 5 is a representation of a cross-sectional view of a portion of a hinge 405 (e.g., hinge 105), according to at least one embodiment of the present disclosure. The hinge 405 includes a spine 416 magnetically connected to a keyboard 404. The spine 416 includes spine magnets 424 that are magnetically attracted and connected to the keyboard magnets 426.

The spine 416 is oriented at a spine angle 428 relative to the keyboard 404. In the airplane mode, the display is oriented at an angle relative to the keyboard 404. This may make it easier for the user to view and/or interact with the display. The spine may therefore be oriented at a spine angle 428 that is approximately 90° less than the viewing angle. Thus, in some embodiments, the spine angle 428 may be in a range having an upper value, a lower value, or upper and lower values including any of 0°, 5°, 10°, 15°, 20°, 25°, 30°, 35°, 40°, 45°, 50°, 55°, 60°, 65°, 70°, 75°, 80°, 85°, 90°, or any value therebetween. For example, the spine angle 428 may be greater than 0°. In another example, the spine angle 428 may be less than 90°. In yet other examples, the spine angle 428 may be any value in a range between 0° and 90°.

In some embodiments, it may be critical that the spine angle 428 is approximately 15° to provide the user with the optimal viewing angle. Nevertheless, the magnetic force between the spine magnets 424 and the keyboard magnets 426 may maintain the connection between the spine 416 and the keyboard 404. In some embodiments, the spine magnets 424 may be oriented within the spine 416 to orient the spine magnetic field with the keyboard magnetic field, taking into account the spine angle 428.

The spine 416 may be disconnected from the keyboard 404 with a disconnection force. The disconnection force may be the force required to overcome the magnetic attraction between the spine magnets 424 and the keyboard magnets. In some embodiments, the disconnection force may be in a range having an upper value, a lower value, or upper and lower values including any of 1 N, 2 N, 3 N, 4 N, 5 N, 6 N, 7 N, 8 N, 9 N, 10 N, 15 N, 20 N, or any value therebetween. For example, the disconnection force may be greater than 1 N. In another example, the disconnection force may be less than 20 N. In yet other examples, the disconnection force may be any value in a range between 1 N and 20 N. In some embodiments, it may be critical that the disconnection force is greater than 6 N to secure the display to the keyboard while still being easily disconnectable.

INDUSTRIAL APPLICABILITY

This disclosure generally relates to devices, systems, and methods for magnetically connecting a display to a keyboard in an airplane mode. Computing devices may be changeable between multiple different modes or configurations, such as a laptop mode where the keyboard is extended in front of a display, a tablet mode, where the keyboard is located against a back surface of the display, and an airplane mode, where the display is located at an angle with respect to the keyboard. In the airplane mode, the keyboard is underneath the display, with the display supported on the keyboard using a kickstand.

In the airplane mode, the input section of the keyboard is not accessible to the user. To interact with the display, the display is therefore used as a touchscreen display. As the user touches and interacts with the touchscreen display, the force of the user's touches against the display may cause the body of the display to move and bounce around. This may make using the display frustrating for the user. Magnetically securing a keyboard spine to the keyboard may connect the display to the keyboard. This may support the display during use in airplane mode.

In some embodiments, the keyboard is connected to the display with a hinge. The hinge includes a hinge support and a spine. The spine connects the display to the keyboard. The hinge support supports the hinge during rotation, and may help prevent the hinge from bending too sharply. In some embodiments, the spine magnetically connects the display to the keyboard. In some embodiments, the spine mechanically connects the display to the keyboard. In some embodiments, the spine both magnetically and mechanically connects the display to the keyboard.

In some embodiments, the spine provides communication between the keyboard and the display. For example, the spine may include power and/or data contacts to share power and/or data with the keyboard. In some embodiments, the spine does not communicate between the keyboard and the display, and the keyboard communicates with the display in another manner, such as wirelessly.

The display has a front surface (e.g., the display surface) and a back surface. The keyboard has a front surface (e.g., the surface with the keyboard) and a back surface. The display front surface is on the same side as the keyboard front surface. Thus, when the computing device is rotated into the airplane mode, the display back surface is facing the keyboard back surface.

In some embodiments, the display is secured or connected to the keyboard. In some embodiments, the display is connected to the keyboard with a mechanical connection. For example, the display may be connected to the keyboard with one or more latches, snaps, buttons, bolts, Velcro, mechanical fasteners, other connections, and combinations thereof. In some embodiments, the display is connected to the keyboard with a magnetic connection.

The keyboard back surface may include keyboard magnetic material. In some embodiments, the keyboard magnetic material may include one or more permanent magnets, such as ferromagnets or rare earth magnets. In some embodiments, the keyboard magnetic material may not be magnetized (e.g., a soft magnetic material), such as iron, steel, and other ferromagnetic materials.

The spine may include spine magnetic material. In some embodiments, the spine magnetic material may include one or more permanent magnets, such as ferromagnets or rare earth magnets. In some embodiments, the spine magnetic material may not be magnetized (e.g., a soft magnetic materials), such as iron, steel, and other ferromagnetic materials.

In some embodiments, at least one of the spine magnetic material and the keyboard magnetic material may be a permanent magnet. For example, the spine magnetic material may include one or more permanent magnets and the keyboard magnetic material may be magnetic, but not a permanent magnet. In some examples, the keyboard magnetic material may include one or more permanent magnets and the spine magnetic material may be magnetic, but not a permanent magnet. In some embodiments, both the spine magnetic material and the keyboard magnetic material include permanent magnets.

In some embodiments, the spine magnetic material be located along a length of the spine such that the spine magnetic material aligns with the keyboard magnetic material located along a length of the keyboard back surface. In this manner, when the spine is rotated to contact the keyboard back surface (e.g., into the airplane mode), the spine magnetic material may be magnetically attracted to the keyboard magnetic material. In this manner, the spine may be magnetically secured to the keyboard in the airplane mode.

In some embodiments, the spine magnetic material may include a single magnet. The keyboard magnetic material may include a single magnet. The magnets may be oriented with opposing polarities such that the spine is magnetically secured to the keyboard. In some embodiments, the spine magnetic material may include more than one magnet and the keyboard magnetic material may include more than one magnet. In some embodiments, the spine and/or the keyboard may include any number of magnets, including 1, 2, 3, 4, 5, 6, 7, 8, 9, 10, or more magnets. In some embodiments, the spine may include more magnets that the keyboard, or the keyboard may include more magnets than the spine.

The plurality of spine magnets may be arranged with alternating polarities. The plurality of keyboard magnets may be complementarily arranged with alternating polarities such that individual spine magnets align with a keyboard magnet of the opposite polarity. Including multiple spine magnets and keyboard magnets of opposing polarity may increase the strength and/or stability of the magnetic connection. In some embodiments, the spine magnets and/or the keyboard magnets may be arranged in a Halbach array. A Halbach array may increase the strength of the magnetic connection, and help to prevent extra and unnecessary magnetic fields around the keyboard and/or the spine.

In some embodiments, the spine and/or the keyboard magnets may be exposed. Thus, when the spine magnets are magnetically connected to the keyboard magnets, the spine magnets and the keyboard magnets may contact. In some embodiments, the spine and/or the keyboard magnets may be covered with a material. For example, the spine and/or keyboard magnets may be covered with a fabric material, such as Alcantara fabric and the like. In some embodiments, the spine and/or keyboard may be covered with a magnetically invisible hard material, such as a plastic or a magnetically transparent metal. Thus, when the spine magnets are magnetically connected to the keyboard magnets, the spine magnets and the keyboard magnets may not directly contact, but the magnetic fields may nevertheless maintain a magnetic connection between the spine and the keyboard.

In some embodiments, the spine magnets may include the magnets used to connect the spine to the display. Thus, in some embodiments, the spine magnets may serve a dual purpose, and may simultaneously connect the display to the spine and the spine to the keyboard.

In some embodiments, the spine may rest against the keyboard with an angle. For example, the spine may have a connection surface and a magnetic surface. The connection surface may be the surface that connects to the display, and the magnetic surface may be the surface that connects to the keyboard. Thus, the connection surface may be perpendicular to the display, because the connection surface connects along the long edge of the display. In the airplane mode, the display may be oriented at a display angle with respect to the keyboard.

In some embodiments, the display angle may be in a range having an upper value, a lower value, or upper and lower values including any of 90°, 95°, 100°, 105°, 110°, 115°, 120°, 125°, 130°, 135°, 140°, 145°, 150°, 155°, 160°, 165°, 170°, 175°, 180°, or any value therebetween. For example, the display angle may be greater than 90°. In another example, the display angle may be less than 180°. In yet other examples, the display angle may be any value in a range between 90° and 180°. In some embodiments, it may be critical that the display angle is approximately 105° to provide the user with the optimal viewing angle.

The spine angle is the angle between the spine and the keyboard. In some embodiments, the spine angle is 90° less than the display angle. Thus, in some embodiments, the spine angle may be in a range having an upper value, a lower value, or upper and lower values including any of 0°, 5°, 10°, 15°, 20°, 25°, 30°, 35°, 40°, 45°, 50°, 55°, 60°, 65°, 70°, 75°, 80°, 85°, 90°, or any value therebetween. For example, the spine angle may be greater than 0°. In another example, the spine angle may be less than 90°. In yet other examples, the spine angle may be any value in a range between 0° and 90°. In some embodiments, it may be critical that the spine angle is approximately 15° to provide the user with the optimal viewing angle. Nevertheless, despite the spine angle, the magnetic force between the spine magnets and the keyboard magnets may maintain the connection between the spine and the keyboard. In some embodiments, the spine magnets may be oriented within the spine to orient the spine magnetic field with the keyboard magnetic field, taking into account the spine angle.

In some embodiments the hinge may include a pocket between the display and the keyboard. The pocket may be located on the front side (e.g., the portion of the hinge between the display surface and the keyboard surface). Thus, as the computing device is rotated into the airplane mode, the pocket may be presented to the user. The pocket may include a stylus, which the user may then use to interact with the display. Because of the strong connection between the spine and the display, the user may use the stylus on the display without moving or jostling the display too much.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A keyboard, comprising:
    a keyboard surface comprising an input portion;
    a keyboard back surface proximate to and on an opposite side of the keyboard as the input portion, the keyboard back surface comprising keyboard magnetic material;
    a spine configured to magnetically connect the keyboard to a computing device, the spine comprising spine magnetic material, the spine including first end configured to magnetically connect to a computing device and a second end magnetically connected to the keyboard back surface; and
    a hinge additionally connecting the spine to the keyboard surface and the keyboard back surface.

2. The keyboard of claim 1, wherein the keyboard magnetic material is covered with a fabric material.

3. The keyboard of claim 2, wherein the fabric material is a synthetic textile material.

4. The keyboard of claim 1, wherein the spine magnetic material is covered with a fabric material.

5. The keyboard of claim 1, wherein the keyboard magnetic material includes a plurality of permanent magnets.

6. The keyboard of claim 5, wherein the plurality of permanent magnets are arranged with alternating polarity.

7. The keyboard of claim 1, wherein at least one of the keyboard magnetic material and the spine magnetic material comprise a Halbach array of permanent magnets.

8. The keyboard of claim 1, wherein the keyboard magnetic material is aligned with the spine magnetic material.

9. A computing device, comprising:
    a display;
    a removable keyboard including an input portion, a back surface of the removable keyboard comprising keyboard magnetic material, the back surface being opposite the input portion; and
    a spine connected to the removable keyboard with a hinge, the spine removably connecting the display to the removable keyboard, the spine comprising spine magnetic material,
    wherein in an airplane mode the keyboard magnetic material is magnetically attracted to the spine magnetic material to provide an additional connection between the spine and the keyboard.

10. The computing device of claim 9, wherein the spine is magnetically connectable to the display with the spine magnetic material.

11. The computing device of claim 9, wherein the spine provides data communication between the removable keyboard and the display.

12. The computing device of claim 9, further comprising a pocket in the hinge between the removable keyboard and the display, wherein the pocket is located on an input side of the removable keyboard.

13. The computing device of claim 12, wherein the pocket comprises a stylus configured to interact with the display.

14. The computing device of claim 9, wherein the display includes a display support configured to extend and support the display between the back surface of the removable keyboard and the display.

15. The computing device of claim 9, wherein the display includes a display back surface, and wherein, in the airplane mode, the display back surface is facing the back surface of the keyboard.

16. A method for securing a computing device, comprising:
    magnetically affixing a spine located between a display surface and a keyboard to a display;
    rotating the keyboard away from the display surface of the display, wherein the keyboard is rotated about a hinge, the spine magnetically connected to the keyboard by the hinge; and
    while the spine is magnetically affixed to the display, magnetically affixing the spine to a back surface of the keyboard, the back surface being located opposite an input portion of the display, so that the spine is magnetically connected to the keyboard via the hinge and via the back surface.

17. The method of claim 16, wherein affixing the spine includes mechanically affixing the spine to the keyboard.

18. The method of claim 16, further comprising disconnecting the spine from the keyboard by rotating the display surface toward the keyboard.

19. The method of claim 18, wherein disconnecting the spine comprises disconnecting the spine with a disconnection force of at least 6 N.

* * * * *

UNITED STATES PATENT AND TRADEMARK OFFICE
CERTIFICATE OF CORRECTION

| | | |
|---|---|---|
| PATENT NO. | : 11,249,519 B2 | Page 1 of 1 |
| APPLICATION NO. | : 16/782741 | |
| DATED | : February 15, 2022 | |
| INVENTOR(S) | : Katherine Margaret Bailey et al. | |

It is certified that error appears in the above-identified patent and that said Letters Patent is hereby corrected as shown below:

In the Specification

Column 7
Line 14 change "such as Alcantara fabric and the like." to --such as ALCANTARA® fabric and the like.--

Signed and Sealed this
Seventh Day of June, 2022

Katherine Kelly Vidal
*Director of the United States Patent and Trademark Office*